No. 880,957. PATENTED MAR. 3, 1908.
J. W. AYLSWORTH.
STORAGE BATTERY ELECTRODE.
APPLICATION FILED APR. 28, 1905.
2 SHEETS—SHEET 1.
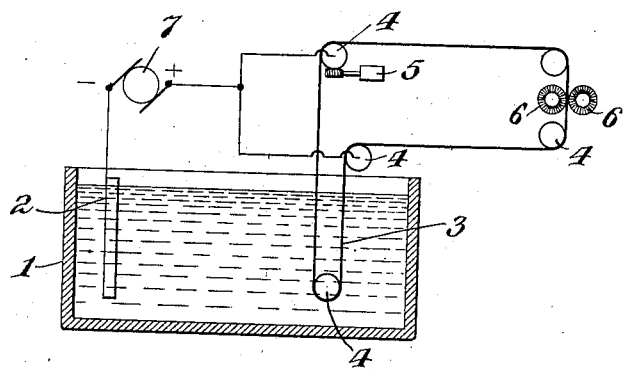
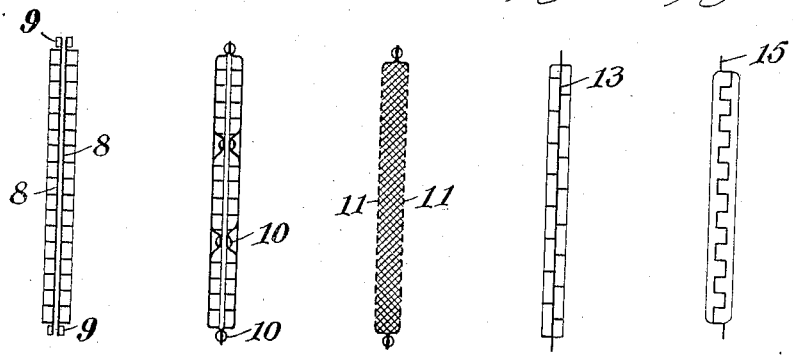
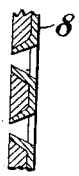
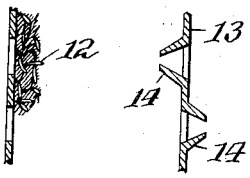
Attest:
Edgworth Greene
Delos Holden
Inventor:
Jonas W. Aylsworth
by Frank L. Dyer
Atty.

No. 880,957.

PATENTED MAR. 3, 1908.

J. W. AYLSWORTH.
STORAGE BATTERY ELECTRODE.
APPLICATION FILED APR. 28, 1905.

2 SHEETS—SHEET 2.

Witnesses:

Inventor:
Jonas W. Aylsworth
by
Frank L. Dyer
Atty.

UNITED STATES PATENT OFFICE.

JONAS W. AYLSWORTH, OF EAST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE-BATTERY ELECTRODE.

No. 880,957.     Specification of Letters Patent.     Patented March 3, 1908.

Application filed April 26, 1905. Serial No. 257,875.

*To all whom it may concern:*

Be it known that I, JONAS W. AYLSWORTH, a citizen of the United States, residing at East Orange, in the county of Essex and State of New Jersey, have invented a certain new and useful Storage-Battery Electrode, of which the following is a description.

My invention relates to various new and useful improvements in storage battery electrodes of the type employing an alkaline electrolyte with insoluble active materials, and particularly to the positive or depolarizing electrodes in which the active mass consists of nickel hydroxid, as in the well-known Edison battery, and my object is to provide a simple and effective electrode for this purpose.

The invention depends upon the fact that hydrated peroxid of nickel—$Ni(OH)_3$—can be formed in and plated out of a cyanid solution electrolytically. Such a hydrated peroxid is electrically conducting and unlike metals in a plating bath it deposits on the anode instead of on the cathode. Consequently, no deposit takes place on the cathode, which will not be affected by the hydrogen developed thereon, except to the extent that it will be very perfectly cleaned by the reducing and mechanical scouring action of the hydrogen gas. The anode is also unaffected for the reason that in the alkaline solution used, any oxygen developed thereon serves to form the nickel peroxid, as will be explained, which subsequently deposits on the anode. This phenomenon relating to the electrolytic formation and deposit of the hydrated peroxid of nickel can be utilized in connection with the manufacture of storage battery electrodes by employing the supports as the anodes, upon which the active material is deposited in the electrolytic bath, or instead, the deposited peroxid may be continuously or intermittently removed from the anode on which it is deposited, and be employed in connection with any suitable electrode structure, as for instance, the ordinary perforated pockets of the Edison battery.

Figure 10:
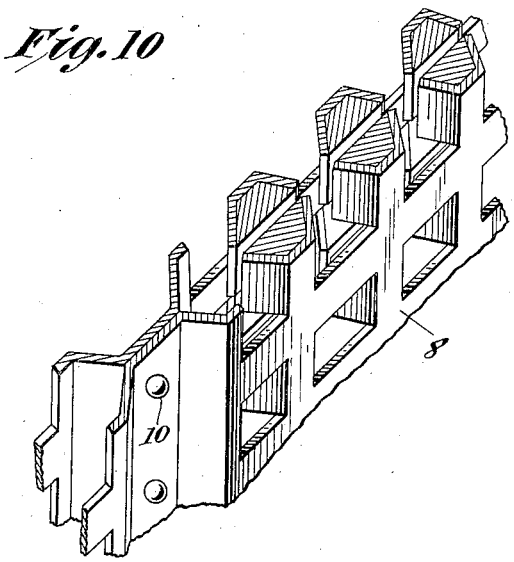

In order that the invention may be better understood, attention is directed to the accompanying drawings forming part of this specification, and in which Figure 1 is a diagrammatic view of a suitable apparatus used in connection with the manufacture of hydrated peroxid of nickel electrolytically, when the latter is not to be employed directly, but is to be removed from the anode on which it is deposited and separately used in connection with the electrode support. Fig. 2 a sectional view showing one form of anode on which the deposit may be made, where the latter is to be employed directly. Fig. 3 an enlarged sectional view, showing a small portion of one of the plates with the deposit thereon. Fig. 4 a view corresponding to Fig. 2, with the two plates reversed and riveted together, showing the complete electrode. Fig. 5 a sectional view showing a modified form of electrode, wherein the deposit takes place within a spongy conducting mass. Fig. 6 an enlarged sectional view, showing a part of Fig. 5. Fig. 7 a sectional view of the modified form of electrode, where the deposit takes place on both sides of an oppositely perforated plate. Fig. 8 an enlarged sectional view of a part of Fig. 7, Fig. 9 a sectional view, showing a further modification where the deposit is effected on a corrugated conducting plate. Fig. 10, a greatly enlarged sectional detail of Fig. 4 and Fig. 11 a similar detail of Fig. 9.

In these views corresponding parts are represented by the same numerals of reference.

Referring first to Fig. 1, I show a plating tank 1, made of any suitable material, with the cathode 2 therein, formed of a plate of insoluble material not effected by electrolysis when used as a cathode in a cyanid solution, such as graphite or iron, or nickel or cobalt, or nickel-cobalt alloy. The anode 3 is in the form of a long endless strip, such as nickel or cobalt, or nickel-cobalt alloy passing over rollers 4 and driven in any suitable way, as for instance, by an electric motor 5. Bearing on this anode strip are two brush wheels or scrapers 6, for removing material deposited on the anode, as will be understood. Current is supplied from a plating dynamo 7, the connections being obvious. With such an apparatus (which of course is merely illustrative) I form the active material electrolytically in any suitable way, examples of which are the following:

(1) Cyanid of potassium (KCy) is added to a solution of a soluble nickel salt, such as the sulfate ($NiSO_4$) or the chlorid ($NiCl_2$), until the precipitate which at first forms, is nearly all redissolved. To this solution, I then add preferably an equal volume of 20 per cent. solution of potassium hydroxid, (KOH) both solutions being preferably hot. Good results can be secured when a much smaller volume of the alkaline solution is employed, but preferably a great excess of alkali is used, in order to reduce the likelihood of the anode being attacked electrolytically. When such a solution is employed, (for instance in the tank 1) the current results in the electrolytic deposition of the hydrated peroxid of nickel on the anode 3, which deposit may be removed by the revolving brushes 6, as will be understood. With this solution, the plating is preferably carried on at a high rate (for instance .5 ampere per square inch, or even more) since in this way the deposit is detached more easily than when the deposit takes place slowly.

(2) A solution of cyanid of potassium (KCy) is first saturated with nickel cyanid ($NiCy_2$) after which an equal volume of 20 per cent. potassium hydroxid (KOH) is added. To the clear solution thus obtained, I then add a quantity of cyanid of nickel, which remains as a precipitate in the solution and the amount of which may be varied within wide limits. With such a solution, the plating operation is preferably carried on as rapidly as in the first example. As the nickel peroxid is plated out of the solution, it will be automatically regenerated from the cyanid of nickel precipitated therein. As this precipitate thus becomes dissipated, additional quantities of nickel cyanid may be added to the solution from time to time. Instead of using nickel cyanid for this purpose, nickel hydrate—$Ni(OH)_2$—may be used, although not so effectively.

A solution made in accordance with the second example gives the best results, particularly when the process is employed for depositing the active material directly on the electrode support, as I shall explain, since the deposited peroxid is very pure and there are no acid radicals in the solution to interfere with the deposit. With the solution first described, such a result might take place, but that solution is entirely useful where the process is employed for manufacturing the active material independently of the electrode support and where very thick layers of the active material are not necessary.

It will be understood that many other solutions from which nickel peroxid may be plated, may be employed, as for example, a solution of the double cyanid of nickel and soda, with an excess of sodium hydrate. Double cyanids of lithium, calcium and barium with nickel may also be used, as well as combinations of such cyanids.

It will be evident that instead of depositing the active material on an anode from which the active material is removed either continuously, or from time to time, the anode itself may constitute the electrode support, whereby the electrolytic deposit of the active material on that support will be carried out as one of the steps of a process for making electrodes. A number of examples of electrode supports adapted to receive the electrolytic deposit are illustrated in the accompanying drawings.

Referring first to Figs. 2, 3, 4 and 10, I take two plates 8, having minute openings punched therein, so as to form projecting burs, (Fig. 3) and these plates are placed together with the burs extending outwardly and temporarily held by clips or bands 9 (Fig. 2). They are now used as anodes in a suitable plating bath, preferably in connection with the solution made according to the second example above described, and the nickel hydroxid is deposited on the two plates as shown, its adhesion thereto being increased by reason of the projecting burs. After the deposit has taken place, the plates are separated and reversed and are held together by rivets 10 (Fig. 4) to complete the electrode. With such an electrode the relatively thin layers of active material and the numerous projecting burs extending through the same, make it unnecessary to employ separate flakes of conducting material, as is desirable where comparatively thick masses of active material are to be used.

In Figs. 5 and 6 I illustrate another arrangement in which a pocket is formed of two perforated plates 11, with an interior sponge-like or honeycomb mass of conducting flakes or scales welded together to form innumerable connecting cells as disclosed, for instance, in the application of Thomas A. Edison filed March 30, 1905, Serial No. 252,929, which also explains several processes for making such a spongy mass. Such an electrode is used as the anode in the plating bath and the nickel peroxid will be deposited within the sponge-like conducting mass, so as to substantially fill all the pores or cells thereof, after which any of the peroxid adhering to the outside of the plates 11 may be scraped off.

In Figs. 7 and 8, a plate 13 is formed with oppositely punched openings, forming burs 14 (Fig. 8) extending outwardly on the opposing faces. The deposit takes place on the two faces of this plate which may be then used directly as an electrode, or instead, one or more of the plates 13 may be arranged between the two plates 8 (Fig. 4), after which all the plates will be riveted together, as will be understood.

Figure 11:
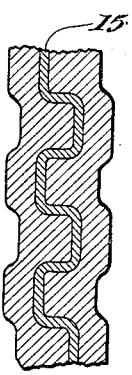

In Figs. 9 and 11, I illustrate an arrangement wherein a plate 15 is formed with parallel channels or corrugations therein, which act as pockets into which the deposit of active material may take place. Of course, many other forms of plates or other electrode supports may be employed than those described, the essential idea being to provide an arrangement by which the active material may adhere tenaciously to the anode support on which it is deposited. I find, however, that where the deposit takes place slowly from solution the latter should be kept at about 80 degrees centigrade, and if not too thick it will adhere satisfactorily to a plain plate, neither corrugated nor perforated. It will be understood that in any event the anode or electrode support on which the active material is deposited should be made of some material not affected by electrolysis in alkaline solution, and capable of good contact with the active material, preferably sheets of metallic cobalt or cobalt-nickel alloy, or sheet steel plated with cobalt or cobalt-nickel alloy, as described in the Edison application above referred to.

Having now described my invention, what I claim as new therein and desire to secure by Letters Patent is as follows:—

1. A storage battery electrode, comprising a conducting support and electrolytically deposited hydrated peroxid of nickel applied to the same, substantially as set forth.

2. A storage battery electrode, comprising a conducting support and hydrated peroxid of nickel electrolytically deposited thereon, substantially as set forth.

3. A storage battery electrode, comprising a perforated plate and electrolytically deposited hydrated peroxid of nickel applied thereto, substantially as set forth.

4. A storage battery electrode, comprising a perforated plate and hydrated peroxid of nickel electrolytically deposited thereon, substantially as set forth.

5. A storage battery electrode comprising two opposed perforated plates and electrolytically deposited hydrated peroxid of nickel between the said plates, substantially as set forth.

6. A storage battery electrode comprising two opposed perforated plates and electrolytically deposited hydrated peroxid of nickel between the said plates and deposited directly thereon, substantially as set forth.

7. A storage battery electrode, comprising two opposed contacting plates and hydrated peroxid of nickel electrolytically deposited on the inner faces thereof, substantially as set forth.

8. A storage battery electrode, comprising two opposed conducting plates, a metallic conducting sponge maintained between said plates and electrolytically deposited active material in said sponge, substantially as set forth.

9. A storage battery electrode, comprising two opposed perforated plates, a conducting metallic sponge between said plates and active material electrolytically deposited within said sponge, substantially as set forth.

10. A storage battery electrode, comprising two opposed perforated plates, a metallic sponge between said plates and hydrated peroxid of nickel electrolytically deposited in said sponge, substantially as set forth.

This specification signed and witnessed this 26th day of April 1905.

JONAS W. AYLSWORTH.

Witnesses:
FRANK L. DYER,
ANNA R. KLEHM.